United States Patent [19]
Chen

[11] Patent Number: 5,628,084
[45] Date of Patent: May 13, 1997

[54] SPACER FOR A WINDSHIELD WIPER

[76] Inventor: Ing-Chau Chen, No. 615, Hsiao-Tung Rd., Yung-Kang City, Tainan Hsien, Taiwan

[21] Appl. No.: 708,222

[22] Filed: Sep. 6, 1996

[51] Int. Cl.$^6$ ............................................. B60S 1/54
[52] U.S. Cl. .................... 15/250.19; 15/250.14; 15/257.01; 15/250.001
[58] Field of Search .............. 15/250.19, 250.202, 15/250.16, 250.351, 250.4, 250.001, 257.01, 250.44

[56] References Cited

FOREIGN PATENT DOCUMENTS

| | | | |
|---|---|---|---|
| 3226258 | 1/1984 | Germany | 15/250.19 |
| 3325707 | 1/1985 | Germany | 15/250.19 |
| 3346845 | 7/1985 | Germany | 15/250.19 |
| 173355 | 7/1987 | Japan | 15/250.19 |
| 249549 | 10/1989 | Japan | 15/250.19 |
| 162616 | 6/1993 | Japan | 15/250.19 |

*Primary Examiner*—Gary K. Graham
*Attorney, Agent, or Firm*—Cushman Darby & Cushman IP Group of Pillsbury Madison & Sutro, LLP

[57] ABSTRACT

A spacer for a windshield wiper includes an anchoring member, a cylindrical shaft, a biasing device, a bracing stand, and a retaining device. The anchoring member is to be mounted on the wiper blade seat and has a shaft accommodation hole. The shaft is inserted into the hole and is rotatable relative thereto but is not movable in an axial direction. The shaft includes an enlarged head exposed outwardly of the hole and is formed with a radially and outwardly projecting pivot pin that extends into a bearing hole in the bracing stand, thereby mounting the bracing stand on the shaft. The biasing device is sleeved on the shaft to bias the latter to rotate in a clockwise direction. The retaining device retains the bracing stand against rotation by the biasing device once the lower portion of the bracing stand is moved toward the windshield wiper to abut against the windshield so as to space the windshield wiper from the windshield against the urging action of the wiper arm.

9 Claims, 5 Drawing Sheets

SPACER FOR A WINDSHIELD WIPER

BACKGROUND OF THE INVENTION

1. Field of the Invention

The invention relates to a spacer, more particularly to a spacer which is adapted to be mounted on a windshield wiper so as to position and space apart the windshield wiper from a windshield of a car when the windshield wiper is not in use.

2. Description of the Related Art

A conventional windshield wiper is usually mounted on the windshield of a car and is urged by a wiper arm to abut against the windshield for wiping rain water therefrom. The windshield wiper includes a wiper blade seat mounted pivotally on the wiper arm, and an elongated wiper blade disposed on and attached to the wiper blade seat. The wiper blade is formed with an elongated wiper blade rubber element which abuts against the windshield such that when left unattended or unused for a relatively long period of time, dirt may accumulate on the windshield and the rubber element. When actuated, the rubber element may cause scratches on the windshield, thereby resulting in poor visibility through the windshield.

SUMMARY OF THE INVENTION

The object of this invention is to provide a spacer which is to be fixed on the windshield wiper of a car so as to position and space apart the windshield wiper from the windshield when the former is not in use.

Accordingly, the spacer of this invention is adapted to be fixed on a windshield wiper of a car so as to position and space apart the windshield wiper from a windshield when the former is not in use. The windshield wiper is urged by a wiper arm to abut against the windshield for wiping rain water therefrom, and includes a wiper blade seat mounted pivotally on the wiper arm, and an elongated wiper blade disposed on and attached to the wiper blade seat. The wiper blade is formed with an elongated wiper blade rubber element to abut against the windshield. The spacer includes an anchoring member, a cylindrical shaft, a biasing device, a bracing stand and a retaining device. The anchoring member is adapted to be mounted on the wiper blade seat and includes a shaft accommodation hole which substantially extends toward the wiper blade seat and which is parallel to the windshield. The shaft is inserted into the shaft accommodation hole and is rotatable relative thereto but is not movable in an axial direction of the shaft. The shaft includes an enlarged head portion exposed outwardly of the accommodation hole. The head portion is formed with a pivot pin which projects radially and outwardly therefrom such that the pin is transverse to the shaft and is substantially parallel to the windshield wiper. The biasing device biases the shaft to rotate in a clockwise direction. The bracing stand has an upper portion mounted pivotably on the pivot pin so as to turn the lower portion thereof to move toward and away from the windshield wiper. The retaining device retains the bracing stand against rotation by the biasing action of the biasing device once the lower portion of the bracing stand is moved toward the windshield wiper to abut against the windshield so as to space the windshield wiper from the windshield against the urging action of the wiper arm.

When the windshield wiper is actuated to commence sweeping action, traction force between the windshield and the lower portion of the bracing stand will cause the lower portion of the bracing stand to turn away from the windshield wiper so as to relieve the bracing stand from the blocking action of the retaining device in order to permit the biasing device to bias the lower portion of the bracing stand to rotate in the clockwise direction, thereby permitting the windshield blade to retract to the normal position so as to restore the windshield wiper to abut against the windshield in order to effect a wiping action.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
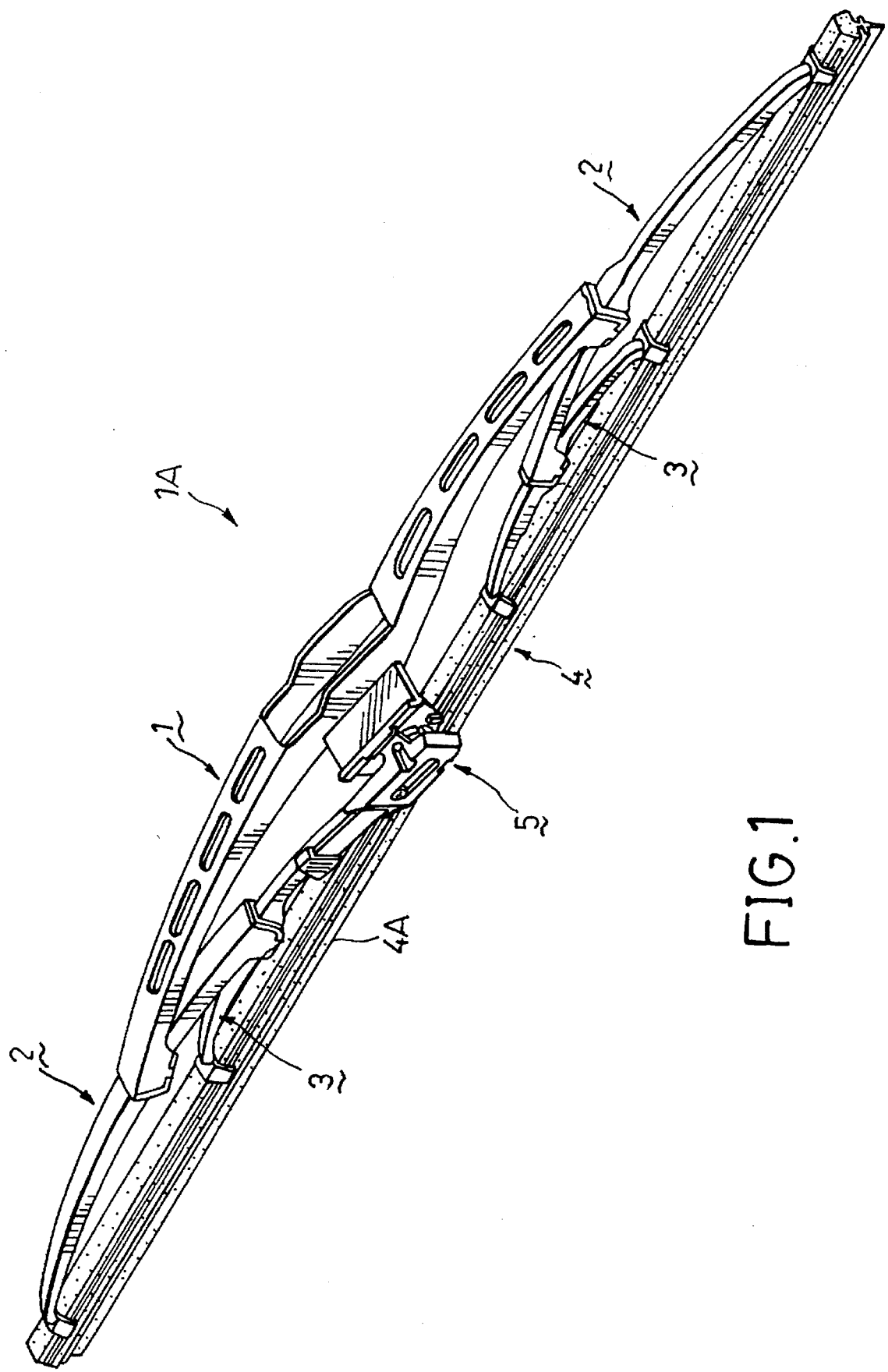
FIG. 1 is a perspective view of a windshield wiper provided with a spacer of this invention.
Figure 2:
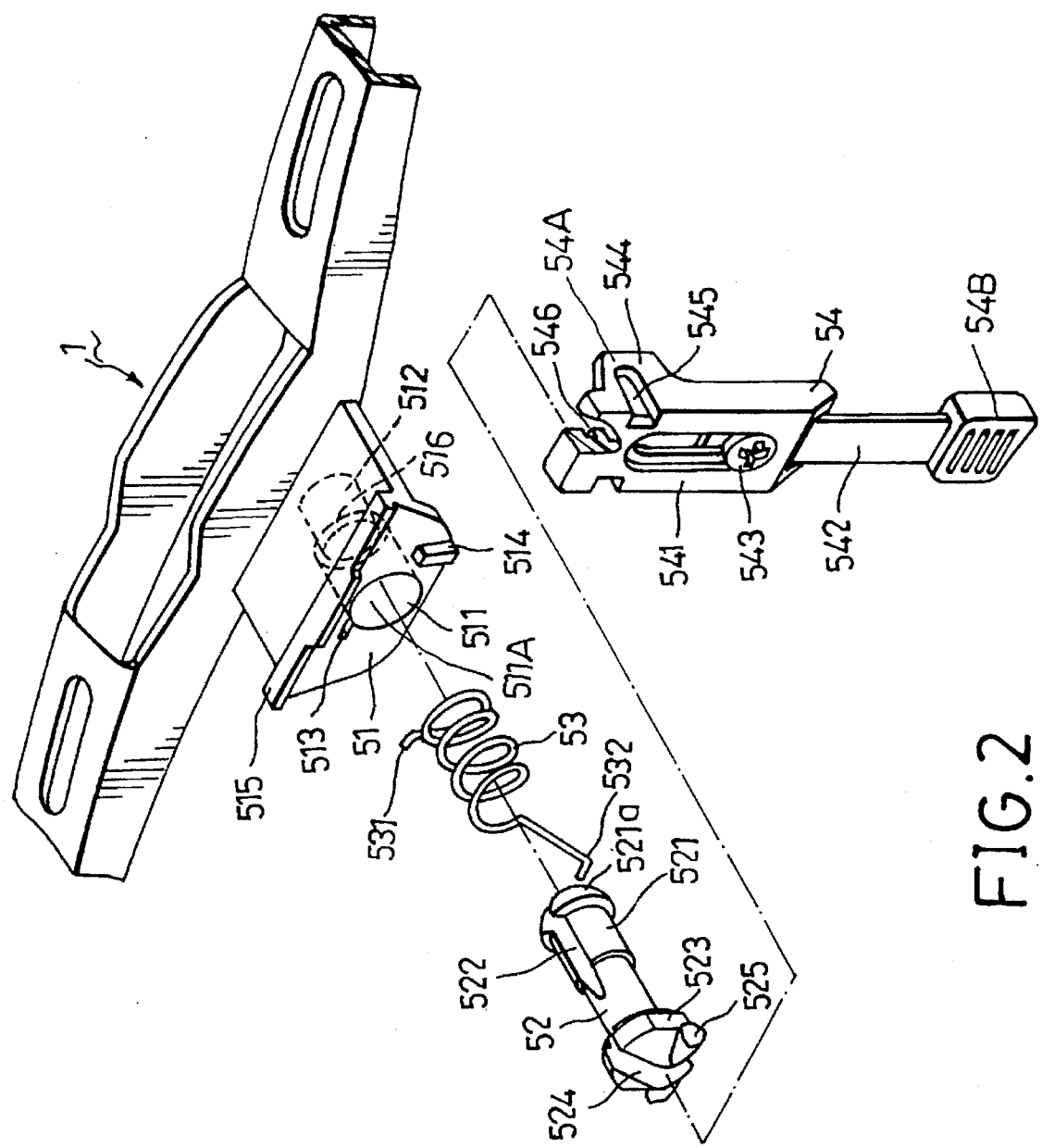
FIG. 2 is an exploded view of the spacer of this invention shown together with a wiper blade seat of the windshield wiper.

Referring to FIGS. 1 and 2, a spacer 5 of this invention is be fixed on a windshield wiper 1A of a car so as to position and space the windshield wiper 1A from a windshield (not shown) when the former is not in use. The windshield wiper 1A is urged by a wiper arm (not shown) to abut against the windshield for wiping rain water therefrom, and includes a wiper blade seat 1 mounted pivotally on the wiper arm, and an elongated wiper blade 4 disposed on and attached to the wiper blade seat 1 by means of two sets of minor clamps 2 and 3. The wiper blade 4 is formed with an elongated wiper blade rubber element 4A that abuts against the windshield (not shown).

As best illustrated in FIG. 2, the spacer 5 includes an anchoring member 51, a cylindrical shaft 52, a biasing device 53, a bracing stand 54, and a retaining device 514. The anchoring member 51 is integrally formed with the wiper blade seat 1 and includes a shaft accommodation hole 511 which substantially extends toward the wiper blade seat 1 and which is generally parallel to the windshield (not shown). The shaft accommodation hole 511 includes an outer larger portion 511A and an inner narrower tubular end portion 512 so as to define a shoulder 516 therebetween.

The cylindrical shaft 52 includes an enlarged head portion 523 and a distal end portion 521 which is opposite to the enlarged head portion 523 and which has a diameter slightly larger than that of the tubular end portion 512, and an axially extending split 522 formed therethrough so that the end portion 521 can be compressed during insertion so as to snugly engage the tubular end portion 512. The head portion 523 of the shaft 52 has a radially and outwardly projecting pivot pin 525 and an axially extending split 524 formed therethrough to divide the pin into first and second pivot pin portions extending radially outwardly from the shaft axis. The pivot pin 525 is transverse to the shaft 52 and extends in a direction substantially parallel to the windshield wiper 1A.

The bracing stand 54 includes an upper portion 541 which has an engagement groove 546 adjacent to a topmost end 54A thereof and a pair of lug portions 544 extending therefrom, and a lower portion 542 detachably attached to the upper portion 541 by means of a screw 543 such that the lower portion 542 is adjustable in distance relative to the upper portion 541. Each of the lug portions 544 is formed with a bearing hole 545. The enlarged head portion 523 of the shaft 52 can be compressed inwardly to permit each of two ends of the pivot pin 525 to be journalled in the hole 545 such that the lower portion 542 of the shaft 52 can pivot about the pin 525 to move toward or away from the windshield wiper 1A.

The biasing device 53, which is preferably a torsion spring, is sleeved on the shaft 52, and the assembly as such is inserted into the shaft accommodation hole 511 in such a manner that the enlarged head portion 523 of the shaft 52 is exposed outwardly of the accommodation hole 511 while the barbed portion 521a of the inner tubular portion 521 engages the tubular end portion 512 and fits snugly therein. After insertion, an inner end 531 of the torsion spring 53 engages the engagement hole 513 in the anchoring member 51 while an outer end 532 of the same engages the groove 546 in the topmost end 54A of the bracing stand 54. Under this condition, the shaft 52 is biased by the torsion spring 53 in the clockwise direction such that, at the normal position, the lower portion 542 of the bracing stand 54 is spaced from the windshield of the car while the rubber element 4A abuts against the windshield to effect a wiping action upon actuation of the windshield.

Figure 3:
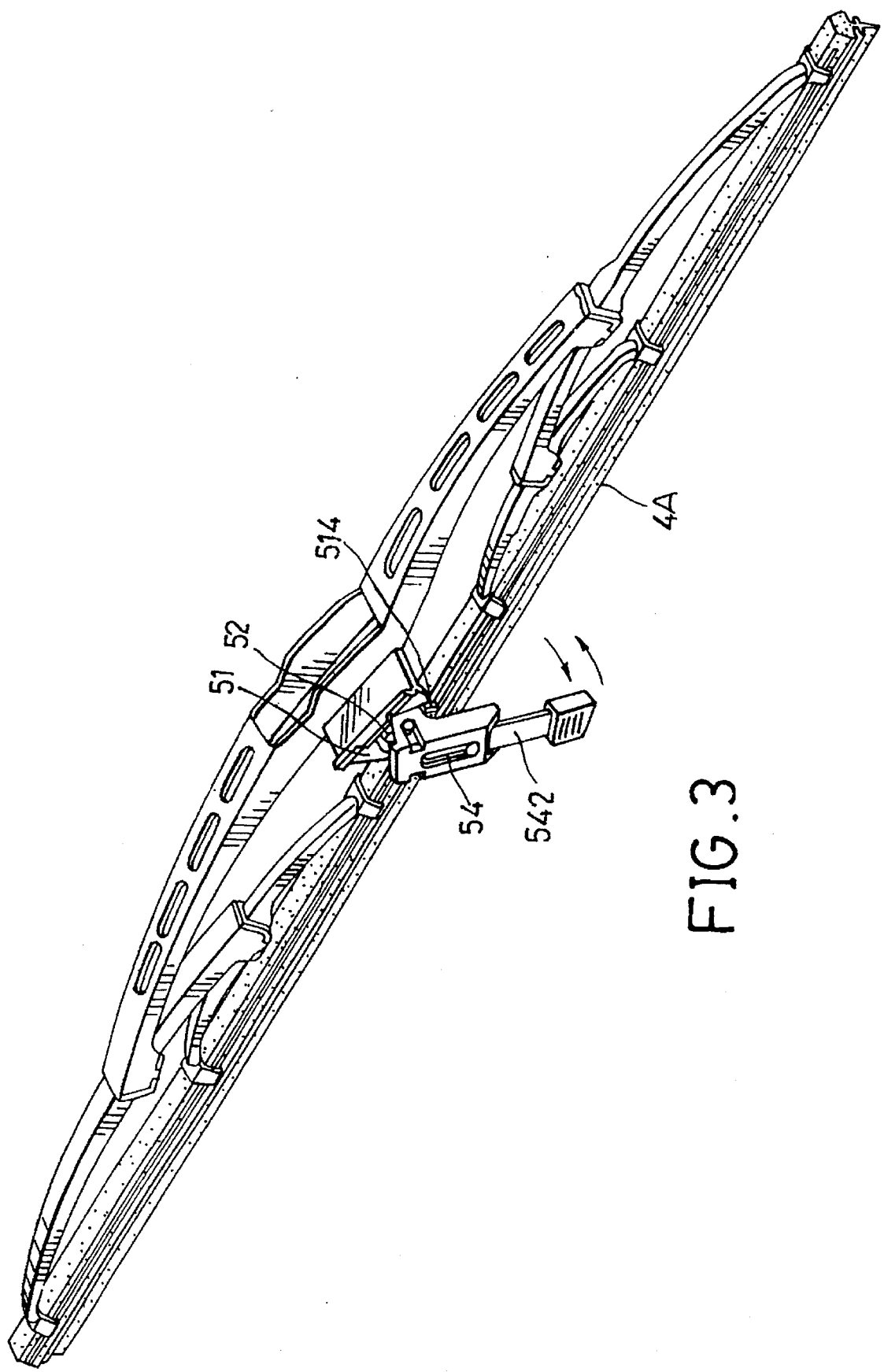
FIG. 3 is a perspective view of the windshield wiper wherein the latter is provided with the spacer of this invention so as to space the windshield wiper from the windshield.
Figure 4:
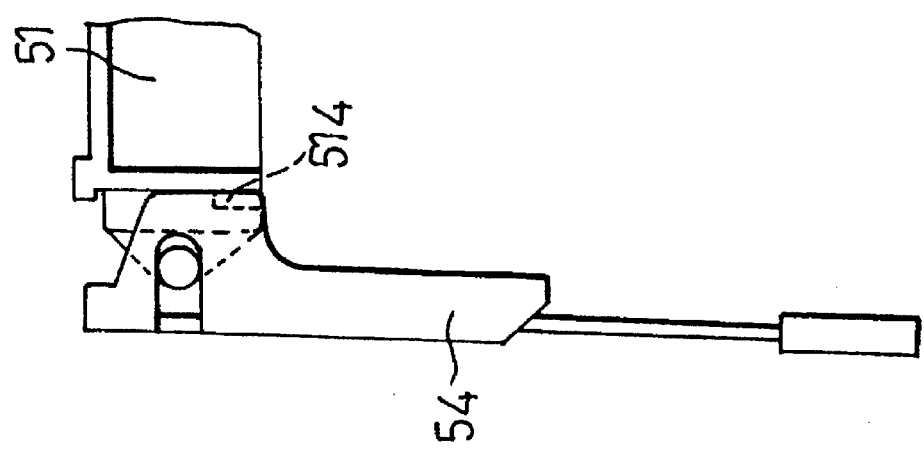
FIG. 4 is a side view of the spacer of this invention, illustrating how a bracing stand employed therein is engaged by a retaining device to space the windshield wiper from the windshield of a car.

Referring to FIGS. 3 and 4, the lower portion 542 of the bracing stand 54 can be moved against the biasing action of the torsion spring 53 so as to rotate the shaft 52 in an anticlockwise direction about an angular distance. Then, the lower portion 542 of the bracing stand 54 is pushed toward the anchoring member 51 against the urging action of the wiper arm (not shown) so as to abut the lowest end 54B thereof against the windshield (not shown) and so as to be retained by the retaining device 514 on the anchoring member 51, thereby preventing reverting of the bracing stand 52 to its normal position. This action correspondingly lifts the wiper blade rubber element 4A upward so as to be spaced apart from the windshield, thereby placing the bracing stand 54 under a blocking position. The abutment of the lowest end 54B of the bracing stand 54 against the windshield creates a relative traction force sufficient to permit the bracing stand 54 to be at a generally upright position on the windshield.

Note that a slight retraction of the torsion spring 53 into the hole 511 during the anticlockwise rotation of the shaft 52 is compensated by the movement of the lower portion 542 of the bracing stand 54 toward the windshield wiper. Therefore, the relative position of the shaft 52 in the hole 511 is unaffected except that the torsion spring 53 possesses a stronger biasing action to push the shaft 52 back to its normal position.

Figure 5:
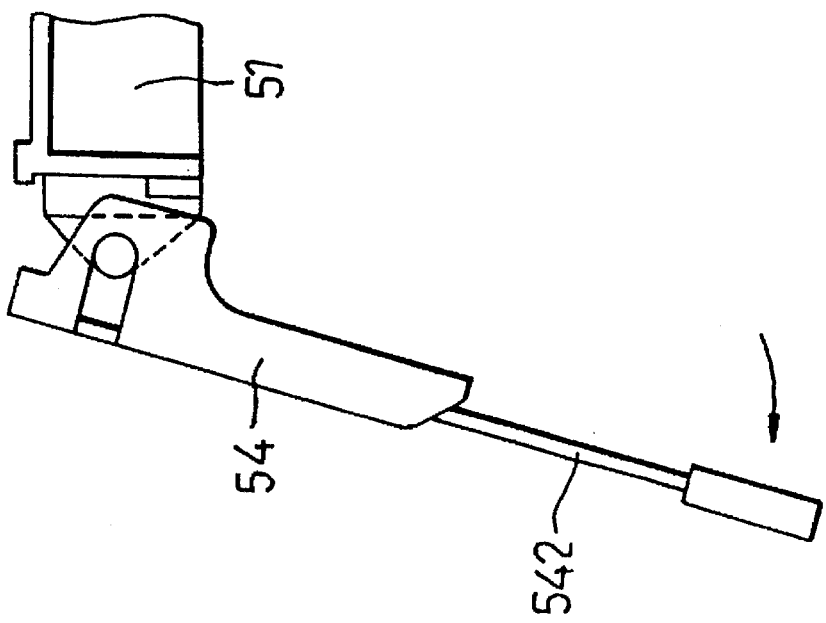
FIG. 5 is a side view of the spacer of this invention, illustrating how the bracing stand employed therein is disengaged from the retaining device prior to reverting to its normal position.

Referring to FIG. 5, when the windshield wiper is actuated to commence a sweeping action, the bracing stand 54 is slightly shaken to a lateral side thereof so as to weaken the traction force generated between the windshield and the lower portion 542 of the bracing stand 54, thereby causing the lower portion 542 to turn away from the anchoring member 51 so as to relieve the bracing stand 54 from the blocking action of the retaining device 514 (see FIG. 2) in order to permit the biasing device 53 (see FIG. 2) to bias the lower portion 542 of the bracing stand 54 to rotate in the clockwise direction. Thus, the bracing stand 54 reverts to its normal position, wherein the wiper blade rubber element 4A abuts the windshield to effect a wiping action.

Figure 6:
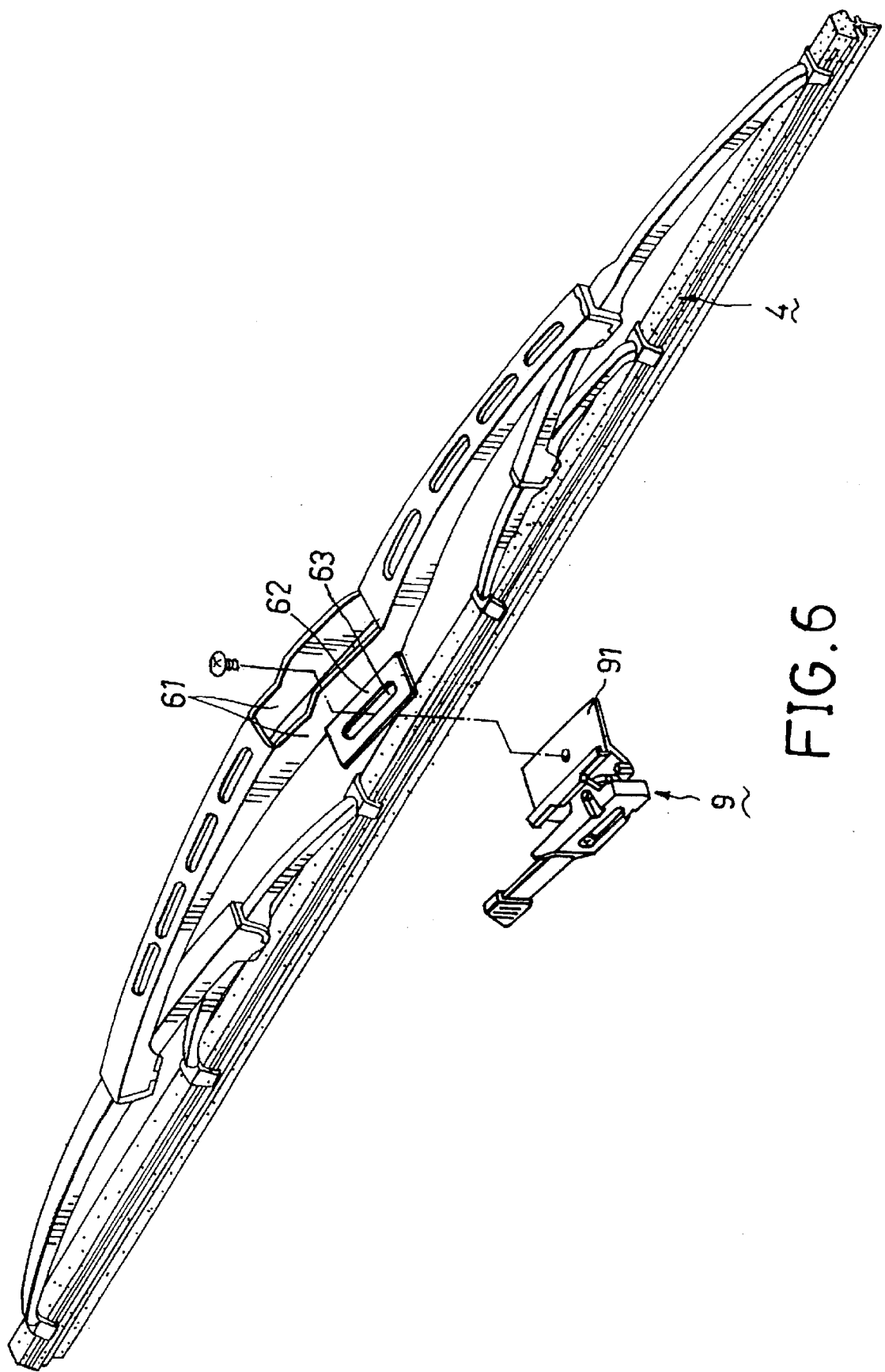
FIG. 6 illustrates a modified spacer of this invention, showing how the modified spacer is mounted on the windshield wiper.

Referring to FIG. 6, a modified spacer of this invention is shown together with a windshield wiper and has the same structure as that disclosed in the previous embodiment so that a detailed description thereof will be omitted herein. The modified spacer 9 includes an anchoring member 91, and a mounting plate 62 which is fixed to the wiper blade seat 61 of the windshield wiper and which is provided with an elongated slot 63 formed therethrough for adjustably mounting anchoring member 91 on the mounting plate 62.

With this invention thus explained, it is apparent that numerous modifications and variations can be made without departing from the scope and spirit of this invention. It is therefore intended that this invention be limited only as indicated in the appended claims.

I claim:

1. A spacer used for positioning a windshield wiper so as to space the windshield wiper from a windshield when the windshield wiper is not in use, the windshield wiper being mounted and urged by a wiper arm to abut against the windshield for wiping rain water therefrom, and including a wiper blade seat mounted pivotally on the wiper arm, and an elongated wiper blade disposed on and attached to the wiper blade seat, the wiper blade including an elongated wiper blade rubber element to abut against the windshield, the spacer being characterized by:

an anchoring member adapted to be mounted on the wiper blade seat, the anchoring member having a shaft accommodation hole substantially extending toward the wiper blade seat and parallel to the windshield;

an elongated cylindrical shaft inserted into the shaft accommodation hole so as to be rotatable relative thereto about an axis but not movable in an axial direction thereof, the cylindrical shaft having an enlarged head portion exposed outwardly of the accommodation hole, the head portion having a pivot pin defined by first and second pivot pin portions that each project radially and outwardly therefrom in opposite directions with respect to said axis such that the pin is transverse to the shaft;

a biasing device for biasing the shaft to rotate in a clockwise direction;

a bracing stand with a lower portion and an elongated upper portion mounted pivotably on the pivot pin so as to turn the lower portion to move toward and away from the windshield wiper; and a retaining device for retaining the bracing stand against rotation by the biasing action of the biasing device once the lower portion of the bracing stand is moved toward the windshield wiper so as to abut against the windshield in order to space the windshield wiper from the windshield against an urging action of the wiper arm, whereby, when the windshield wiper is actuated to commence a sweeping action, traction force generated between the windshield and the lower portion of the bracing stand will cause the lower portion to pivot outwardly away from the windshield wiper so as to relieve the bracing stand from the blocking action of the retaining device in order to permit the biasing device to bias the lower portion of the bracing stand to rotate in the clockwise direction to a normal retracted position so as to restore the windshield blade to abut against the windshield to effect a wiping action.

2. The spacer according to claim 1, characterized in that the shaft accommodation hole has an inner tubular end portion, and the shaft has a distal end portion which is opposite to the enlarged head portion, the distal end portion having compression means that permits snug fitting of the distal end portion in the tubular end portion.

3. The spacer according to claim 2, characterized in that the compression means comprises an axially extending split in the distal end portion so as to facilitate insertion of the distal end portion into the tubular end portion.

4. The spacer according to claim 1, characterized in that the biasing device includes a coil spring which is sleeved on the shaft and which has an end that engages the anchoring member and an opposite end that is attached to the upper portion of the bracing stand.

5. The spacer according to claim 4, characterized in that the upper portion of the bracing stand has a pair of lug portions that extend therefrom and that are disposed tansversely relative to the upper portion, each of the lug portions having a bearing hole therein, which is journalled by, respectively, one of said first and second pivot pin portions.

6. The spacer according to claim 5, characterized in that the lower portion of the bracing stand is detachable from the upper portion.

7. The spacer according to claim 6, characterized in that the lower portion of the bracing stand is adjustable in distance relative to the upper portion.

8. The spacer according to claim 5, characterized in that the enlarged head portion of the shaft has an axially extending split to facilitate journalling of the pivot pin portions in the bearing holes of the lug portions.

9. The spacer according to claim 1, characterized in that the retaining member is disposed on the anchoring member.

* * * * *